United States Patent
Lee et al.

(10) Patent No.: US 9,071,398 B2
(45) Date of Patent: *Jun. 30, 2015

(54) APPARATUS AND METHOD FOR TRANSMIT/RECEIVE OF IMAGE DATA

(71) Applicant: ELECTRONICS AND TELECOMMUNICATIONS RESEARCH INSTITUTE, Daejeon (KR)

(72) Inventors: Woo Yong Lee, Daejeon (KR); Jin Kyeong Kim, Daejeon (KR); Kyeongpyo Kim, Daejeon (KR); Hyoung Jin Kwon, Daejeon (KR); Yong Sun Kim, Daejeon (KR); Jae Sup Lee, Daejeon (KR); Dongyong Lee, Daejeon (KR); Min Taig Kim, Daejeon (KR); Seung ku Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,590

(22) Filed: Oct. 28, 2013

(65) Prior Publication Data

US 2014/0192824 A1 Jul. 10, 2014

Related U.S. Application Data

(63) Continuation of application No. 12/669,604, filed as application No. PCT/KR2008/004214 on Jul. 18, 2008, now Pat. No. 8,594,093.

(30) Foreign Application Priority Data

| Jul. 19, 2007 | (KR) | 10-2007-0072275 |
| Jan. 15, 2008 | (KR) | 10-2008-0004643 |
| Jul. 15, 2008 | (KR) | 10-2008-0068587 |

(51) Int. Cl.
   H04L 1/00    (2006.01)
   H04N 21/63   (2011.01)

(52) U.S. Cl.
   CPC .......... H04L 1/0041 (2013.01); H04L 1/007 (2013.01); H04L 1/0089 (2013.01); H04N 21/631 (2013.01)

(58) Field of Classification Search
   CPC ..... H04L 1/007; H04L 1/0089; H04L 1/0041; H04N 21/631
   USPC .................................................. 370/389, 392
   See application file for complete search history.

(56) References Cited

U.S. PATENT DOCUMENTS

| 5,673,065 A | 9/1997 | DeLeeuw |
| 7,149,956 B1 | 12/2006 | Lu |

(Continued)

FOREIGN PATENT DOCUMENTS

| KR | 1020000004317 A | 1/2000 |
| KR | 1020000076937 A | 12/2000 |
| KR | 1020010081405 A | 8/2001 |

OTHER PUBLICATIONS

International Search Report; mailed Nov. 18, 2008; PCT/KR2008/004214.

(Continued)

*Primary Examiner* — Jae Y Lee
(74) *Attorney, Agent, or Firm* — Ladas & Parry LLP

(57) ABSTRACT

Disclosed are an apparatus and method for transmitting/receiving image data. The method for transmitting image data includes classifying each pixel of image data into upper bits and lower bits, enabling the classified upper bits to be included in a payload of a Most Significant Bit (MSB) packet, and also enabling the classified lower bits to be included in a payload of a Least Significant Bit (LSB) packet, generating a header of the MSB packet and a header of the LSB packet, combining the payload and the header to respectively generate the MSB packet and the LSB packet, and transmitting the generated MSB packet and the LSB packet.

8 Claims, 7 Drawing Sheets

(56) References Cited

U.S. PATENT DOCUMENTS

| | | |
|---|---|---|
| 2004/0216028 A1 | 10/2004 | Fukuhara et al. |
| 2005/0246178 A1 | 11/2005 | Fejzo |
| 2007/0234134 A1 | 10/2007 | Shao et al. |
| 2008/0253462 A1 | 10/2008 | Singh et al. |

OTHER PUBLICATIONS

USPTO NFOA dated Jan. 14, 2013; U.S. Appl. No. 12/669,604.
USPTO NOA mailed Jul. 26, 2013; U.S. Appl. No. 12/669,604.

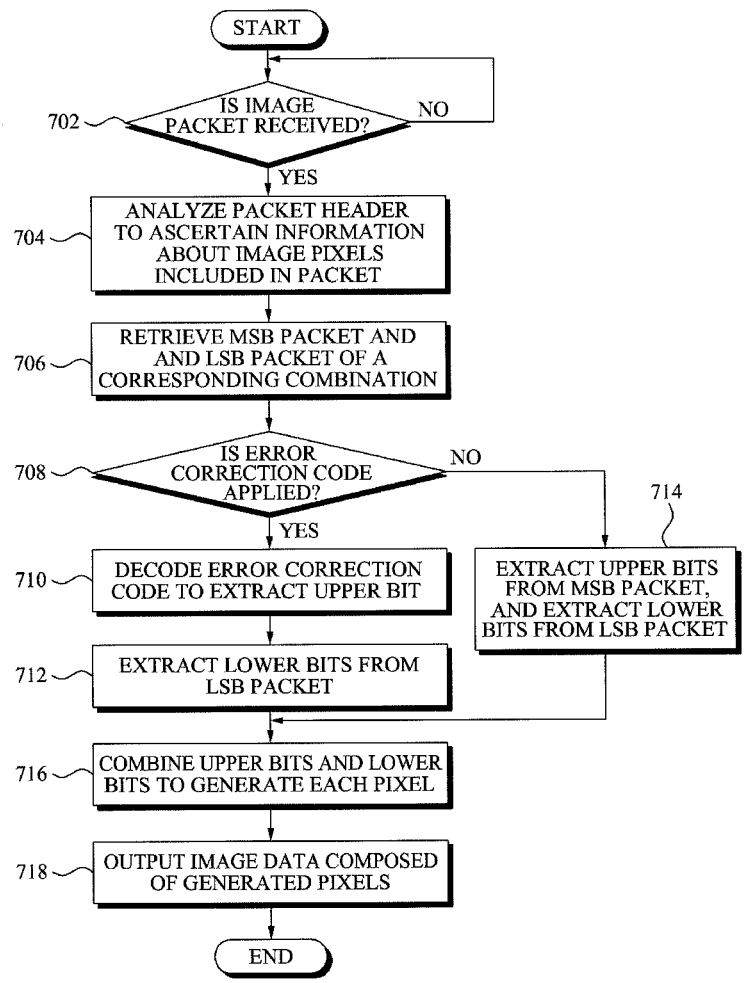

APPARATUS AND METHOD FOR TRANSMIT/RECEIVE OF IMAGE DATA

TECHNICAL FIELD

The present invention relates to an apparatus and method for transmitting/receiving image data, and more particularly, to an apparatus and method for transmitting/receiving image data which may extract significant bits of each pixel composing image data, and insert an error correction code in the extracted significant bits, thereby effectively carrying out error correction.

This work was supported by the IT R&D program of MIC/IITA. [2007-5-002-01, Development of Multi-Gigabit Air Interface Technology]

BACKGROUND ART

Preferably, an error correction code used for error correction is evenly inserted to bits in a case of general data different from image data, because a significance of each bit is the same. However, a significance of bits composing the image data may differ. In a case of the image data, pixels expressing the image may be composed of data of various bits. For example, in a case of pixels expressed with RGB (Red, Green, and Blue), each color may be expressed with total 24-bits being comprised of three 8-bits. 8-bits composing each color may express 256 colors. 8-bit color pixel may have a similar color as that of an adjacent 8-bit color pixel. When errors occur in lower bits according to the standardized RGB color coordinates, a difference in the colors may be insignificantly small, however when errors occur in higher bits, the difference in the colors may be significantly large.

In a case of bits expressing colors as described above, the significance may differ for each bit. Disadvantageously, according to a conventional image transmission method, the same significance is applied to each of the bits without considering the significance for each bit, and the error correction code is inserted to the bits having the same significance.

DISCLOSURE OF INVENTION

Technical Goals

An aspect of the present invention provides an apparatus and method for transmitting/receiving image data which may extract significant bits of each pixel composing image data, and insert an error correction code to the significant bits, thereby achieving effective error correction.

An aspect of the present invention provides an apparatus and method for transmitting/receiving image data which may classify bits into upper bits of significant bits and lower bits of the remaining bits according to significance of each pixel composing image data, enable the upper bits and lower bits to be included in each packet, and respectively transmit and receive each packet through a unique path.

An aspect to the present invention provides an apparatus and method for transmitting/receiving image data which may classify bits into upper bits and lower bits according to significance of each pixel composing image data, enable the upper bits and lower bits to be included in each packet, and transmit and receive packets including the upper bits through a more secure path from among a plurality of paths.

Technical Solutions

According to an aspect of the present invention, there is provided a method for transmitting image data, the method including: classifying each pixel of image data into upper bits and lower bits; enabling the classified upper bits to be included in a payload of a Most Significant Bit (MSB) packet, and also enabling the classified lower bits to be included in a payload of a Least Significant Bit (LSB) packet; generating a header of the MSB packet and a header of the LSB packet; combining the payload and the header to respectively generate the MSB packet and the LSB packet; and transmitting the generated MSB packet and the LSB packet.

According to an aspect of the present invention, there is provided a method for receiving image data, the method including: receiving a MSB packet or a LSB packet, and analyzing a header of each of the received packets to thereby ascertain information on image pixels included in the packet; extracting upper bits from the MSB packet; extracting lower bits from the LSB packet; combining the upper bits and lower bits of a corresponding combination using the ascertained information about image pixels to thereby generate pixels; and combining the generated pixels as image data and outputting.

According to an aspect of the present invention, there is provided an apparatus for transmitting image data, the apparatus including: a bit classification unit to classify each pixel of image data into upper bits or lower bits; a packet generating unit to generate a MSB packet including the upper bits and a LSB packet including the lower bits; and a communication unit to transmit the generated MSB packet and LSB packet.

According to an aspect of the present invention, there is provided an apparatus for receiving image data, the apparatus including: a communication unit to receive a MSB packet or a LSB packet; a packet header analyzing unit to analyze a header of the MSB packet or a header of the LSB packet to ascertain information about image pixels; a bit extracting unit to extract upper bits from the MSB packet and to extract the lower bits from the LSB packet; and an image pixel generating unit to combine the upper bits and lower bits of a corresponding combination using the information about the image pixels to thereby generate pixels, to combine the generated pixels as image data, and to output the combined data.

Advantageous Effects

As described above, according to the present invention, the method and apparatus for transmitting/receiving image data which may classify each pixel composing the image data into upper bits of the significant bits and lower bits of the remaining bits according to the significance of each pixel, enable the classified upper bits and lower bits to be included in each of packets, and transmit/receive the packet including the upper bits through a relatively more secure path, so that the error correction code is inserted to the upper bits having a high significance according to the significance for each of the bits composing the image data, thereby reducing error occurring in the upper bits.

BRIEF DESCRIPTION OF DRAWINGS

FIG. 7 is a flowchart illustrating a process of receiving image data in an apparatus for receiving image data which may effectively carry out error correction according to an exemplary embodiment of the invention.

BEST MODE FOR CARRYING OUT THE INVENTION

Figure 1:
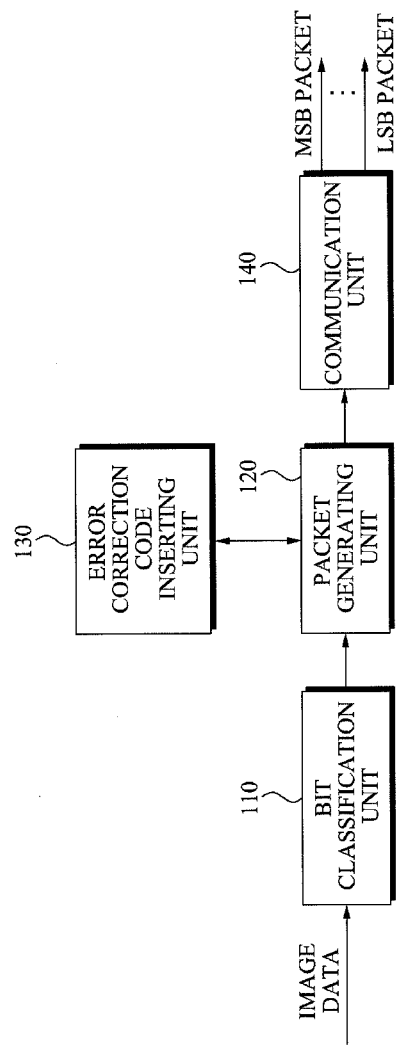
FIG. 1 is a diagram illustrating a structure of an apparatus for transmitting image data which may effectively carry out error correction according to an exemplary embodiment of the invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

The embodiments of the present invention relate to an apparatus for transmitting/receiving image data which may extract significant bits, that is, upper bits of each pixel composing image data, and insert an error correction code to the extracted upper bits, thereby achieving effective error correction.

FIG. 1 is a diagram illustrating a structure of an apparatus for transmitting image data which may effectively carry out error correction according to an exemplary embodiment of the invention. Referring to FIG. 1, the apparatus for transmitting image data includes a bit classification unit 110, a packet generating unit 120, an error correction code inserting unit 130, and a communication unit 140.

The bit classification unit 110 classifies image data received from an upper hierarchy into upper bits having a high significance and lower bits. A number of upper bits may be set by a user in advance, and set to be the most proper number of bits or set depending on a target transmission rate.

A channel error correction code of the code transmission rate of 1/3 may be a convolution code of the transmission rate of 1/3 having a constraint length (k=7) as described in Rate-compatible punctured convolutional code and their application (IEEE transactions on Communication, Vol. 36, No. 7, pp. 389-400, April 1988) by J. Hagenauer. The code transmission rate is a ratio of an output transmission rate to an input transmission rate based on a convolutional encoder. According to the present exemplary embodiment, a polynomial expression for generating a code having the transmission rate of 1/3 and the constraint length of k=7 is represented as Equation 1 using an octal number, and the code may be punctured in 1/2, 2/3, 3/4, 4/5, 5/6, and 7/8 based on the above-described convolutional code of the transmission rate of 1/3 to thereby obtain a desired transmission rate.

$$g_0 = 133_8 \; g_1 = 171_8 \; g_2 = 165_8. \quad \text{[Equation 1]}$$

In this instance, when $\gamma$ denotes a ratio of a number of bits classified into Most Significant Bits (MSB), which is represented as $$\gamma = \frac{\text{A NUMBER OF } MSB}{\text{A NUMBER OF } MSB + \text{A NUMBER OF } LSB}. \quad \text{[Equation 2]}$$

In this instance, when $T_r$ denotes a desired target mean transmission rate and $M_r(<T_r)$ denotes a transmission rate for transmitting the MSB, $L_r$ of a transmission rate for transmitting the LSB is a rational number, which is represented by $$L_r = \frac{T_r - \gamma M_r}{1 - \gamma}. \quad \text{[Equation 3]}$$

In this instance, $L_r$ may be selected to be $L_r \in \{1/3, 1/2, 3/4, 4/5, 5/6, 5/7, 7/8, 8/9, 9/10, 1\}$.

When the target mean transmission rate is determined as 1/2, 2/3, and 3/4 in a case of $\gamma$ of 1/2, an exemplary embodiment such as Table 1 may be obtained, which is represented as

TABLE 1

| Target transmission rate $T_r$ | MSB transmission rate $M_r$ | LSB transmission rate $L_r$ |
|---|---|---|
| 1/2 | 1/3 | 2/3 |
| 2/3 | 1/3 | 1 |
| 3/4 | 1/2 | 1 |

As another exemplary embodiment, when the target mean transmission rate is determined as 3/4 and 4/5 in a case of $\gamma$ of 1/4, Table 2 may be obtained, which is represented as

TABLE 2

| Target transmission rate $T_r$ | MSB transmission rate $M_r$ | LSB transmission rate $L_r$ |
|---|---|---|
| 3/4 | 1/3 | 5/6 |
| 3/4 | 1/2 | 8/9 |
| 4/5 | 1/2 | 9/10 |

As another exemplary embodiment, when the target mean transmission rate is determined as 3/4 and 4/5 in a case of 1/8, Table 3 may be obtained, which is represented as

TABLE 3

| Target transmission rate $T_r$ | MSB transmission rate $M_r$ | LSB transmission rate $L_r$ |
|---|---|---|
| 2/3 | 1/3 | 5/7 |

When a Reed Solomon (RS) code or Low Density Parity Check (LDPC) code may be used for convolutional channel error correction code of block type, a code transmission rate is denoted by $C_r$. The code transmission rate is a ratio of an output transmission rate to input transmission rate in a block type-encoder. When a mean target mean transmission rate for an unequal channel error correction code based on the channel error correction code of block type denotes $T_r (> C_r)$, a MSB transmission rate denotes $M_r$, and LSB transmission rate denotes $L_r$, a ratio $\gamma$ of a number of bits classified into the MSB may satisfy Equation 4, which is represented by $$\gamma = \frac{L_r - T_r}{L_\gamma - M_\gamma} \quad \text{[Equation 4]}$$

A ratio g of the number of bits classified into the MSB is determined to satisfy the mean transmission rate $T_r$, and the determined transmit ratio is transmitted. According to another exemplary embodiment of the invention, when the LSB transmission rate satisfies $L_r$=1 in a case of using RSs 255 and 239, the ratio of the number of bits classified into the MSB may be selected to be 1/2, 1/4, and 1/8, so that each of the target mean transmission rate $T_r$ is 247/255, 251/255, and 253/255.

As another exemplary embodiment of the bit classification unit 110, classifications of image data expressed with RGB will be described in detail with reference to FIG. 3.

Figure 3:
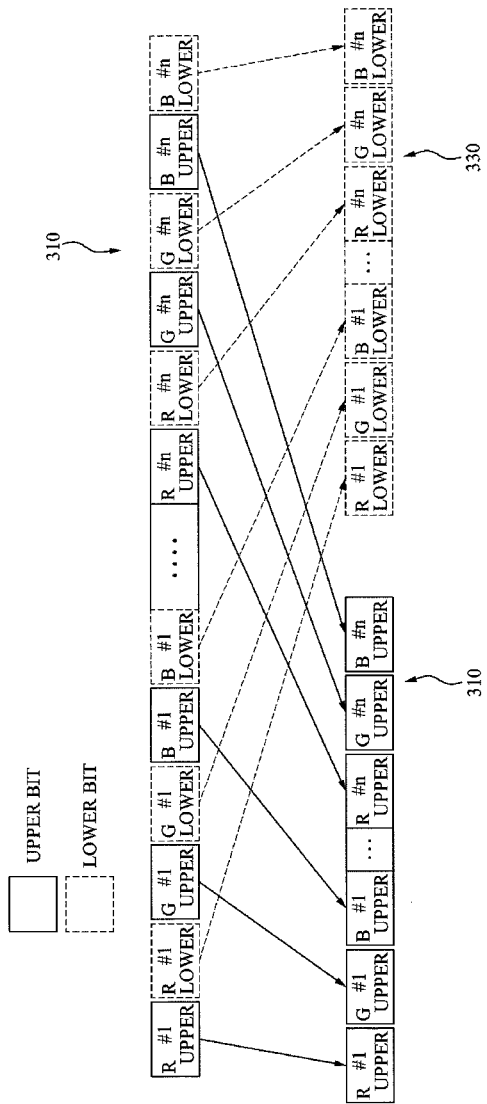
FIG. 3 is a diagram illustrating a state where image data is classified into upper bits and lower bits according to an exemplary embodiment of the invention.

FIG. 3 is a diagram illustrating a state where image data is classified into upper bits and lower bits according to an exemplary embodiment of the invention.

Referring to FIG. 3, image data 310 expressed with RGB is composed of n-numbered pixels, and each of the pixels may be expressed with RGB. Each RGB value is composed of upper bits expressed with dotted lines and lower bits expressed with solid lines. The bit classification unit 110 classifies the image data 310 into an upper bit group 320 of each RGB value of the n-numbered pixels and a lower bit group 330 thereof. An example of the image data expressed with RGB has been described with reference to FIG. 3, however, the present invention is not limited thereto, and thus may be applicable in all image data expressed with a color coordinate such as CMY (Cyan, Magenta, Yellow), HSI (Hue, Saturation, Intensity), YUV, YCbCr, and the like.

The packet generating unit 120 collects the classified upper bits to compose a payload of an MSB packet, and also collects the classified lower bits to compose a payload of an LSB packet. In this instance, the packet generating unit 120 inserts an error correction code to the classified upper bits using the error correction code inserting unit 130 before composing the payload of the MSB packet.

As representative exemplary embodiments of the error correction code used in the error correction code inserting unit 130, insertion of the error correction code using Hamming code 7, 4 will be described in detail with reference to FIG. 4.

Figure 4:
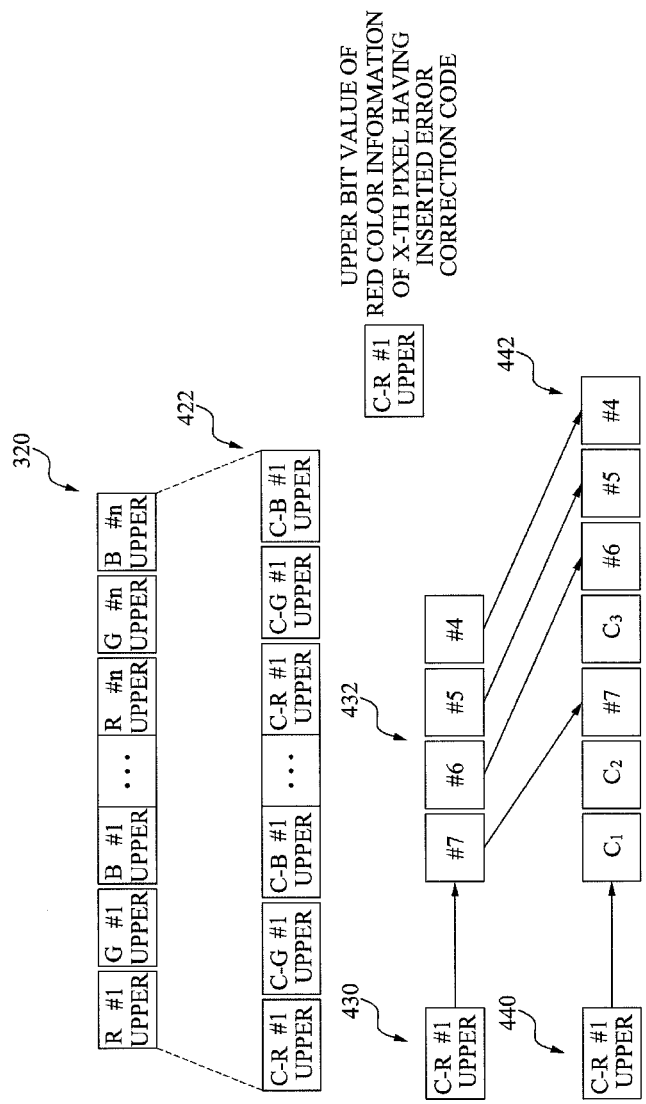
FIG. 4 is a diagram illustrating a structure where a Hamming code is inserted in upper bits of image data according to an exemplary embodiment of the invention.

FIG. 4 is a diagram illustrating a structure where a Hamming code is inserted in upper bits of image data according to an exemplary embodiment of the invention. When only inserting the error correction code to the upper bit 320 classified from image data, an upper bit 422 on which the error correction code is performed may be obtained. A red colored-upper bit 430 of a first pixel denotes $4^{th}$ to $7^{th}$ bit 432 from among red colored bits expressed as '0' to '7' of the first pixel.

When an error correction scheme using the Hamming code 7,4 is applied to the red colored-upper bit 430 of the first pixel, a red colored upper bit 440 of the first pixel on which the Hamming code is applied may be obtained, and a structure of the red colored upper bit 440 has a type such as a structure 442. Here, each of C1, C2, and C3 is an inserted error correction code.

The packet generating unit 120 may respectively generate and combine a header of the MSB packet and a header of the LSB packet from each of the generated payloads of the MSB packet and LSB packet to generate the MSB packet and the LSB packet, and transmit the generated MSB packet and the LSB packet to the communication unit 140. In this instance, the header of the MSB packet and the header of the LSB packet may include error correction code type information, MSB/LSB classification information, information about a position on an image frame of image pixels included in the payload of each of the packets, and sequence information of an image frame.

A structure of the MSB packet and LSB packet based on a packet structure defined in Ecma TC 48 standard will be described in detail with reference to FIG. 5.

Figure 5:
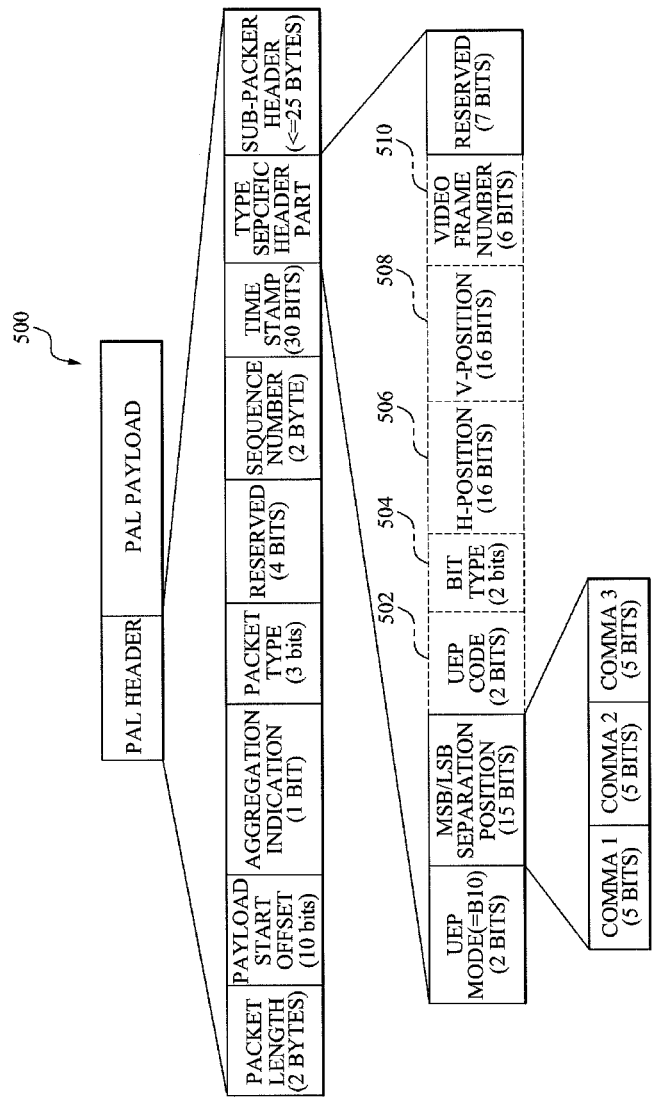
FIG. 5 is a diagram illustrating a structure of a packet including image data according to an exemplary embodiment of the invention.

FIG. 5 is a diagram illustrating a structure of a packet including image data according to an exemplary embodiment of the invention. Referring to FIG. 5, basic information included in a header of a MSB/LSB packet 500 is the same as that defined in the Ecma TC 48 standard, and thus the corresponding detailed description will be omitted. According to the present exemplary embodiment of the invention, the MSB/LSB packet 500 additionally includes a UEP code 502, a bit type 504, a H-position 506, a V-position 508, and a video frame number 510 in the header for the purpose of effective error correction.

Here, the UEP code 502 is type information of the error correction code designating a type of an applied error correction scheme, and the bit type 504 is MSB/LSB classification information used for classifying the packet into the MSB packet or LSB packet. Also, the H-position 506 is a coordinate of a parallel direction of a first image pixel included in the payload, that is, information about a position on an image frame of image pixels included in the payload of each of the packets, and the V-position 508 is a coordinate of a vertical direction of the first image pixel included in the payload, that is, information about the position on the image frame of image pixels included in the payload of each of the packets. Also, the video frame number 510 is sequence information of the image frame being composed of the pixels.

The communication unit 140 transmits the generated MSB packet and LSB packet to an image data receiving apparatus. In this instance, the communication unit 140 respectively transmits each of the MSB packet and LSB packet through a unique communication path. Also, the communication unit 140 transmits the MSB packet through a relatively more secure path in comparison with the path through which the LSB packet is transmitted.

Figure 2:
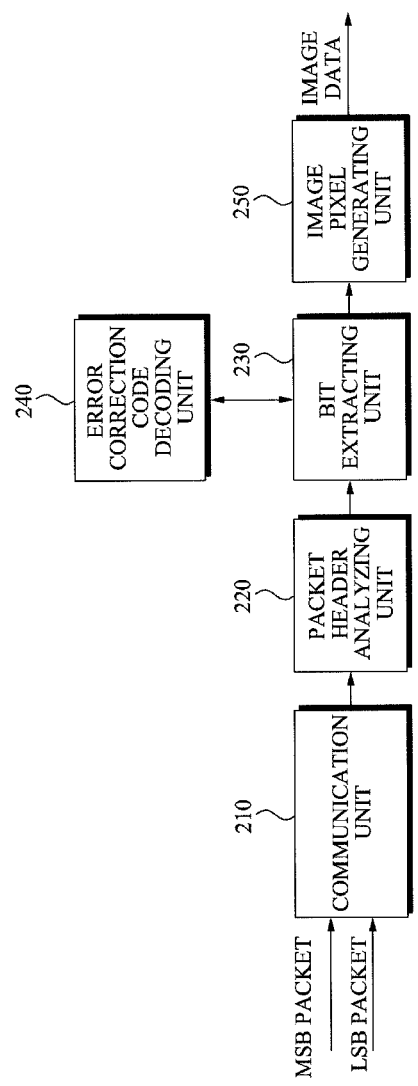
FIG. 2 is a diagram illustrating a structure of an apparatus for receiving image data which may effectively carry out error correction according to an exemplary embodiment of the invention.

FIG. 2 is a diagram illustrating a structure of an apparatus for receiving image data which may effectively carry out error correction according to an exemplary embodiment of the invention. Referring to FIG. 2, the image data receiving apparatus includes a communication unit 210, a packet header analyzing unit 220, a bit extracting unit 230, an error correction decoding unit 240, and an image pixel generating unit 250.

The communication unit 210 receives the MSB packet and LSB packet through at least one communication path.

The packet header analyzing unit 220 analyzes headers of the received MSB packet and LSB packet, and extracts type information of the error correction code, MSB/LSB classification information, information about a position on an image frame of image pixels included in the payload of each of the packets, and sequence information of an image frame.

The bit extracting unit 230 respectively extracts upper bits and lower bits from each of the MSB packet and LSB packet. In this instance, the upper bits on which the error correction encoding is performed are decoded using the error correction decoding unit 240.

The image pixel generating unit 250 may combine the upper bits and lower bits extracted from the MSB packet and LSB packet of a corresponding combination through the bit extracting unit 230 to thereby generate pixels, and combine the generated pixels to be the image data and output. In this instance, the image pixel generating unit 250 processes or predicts the corresponding bit to be '0' when the upper bits or the lower bits are not extracted due to failure in reception of the MSB packet or LSB packet. As a prediction method, average information of surrounding pixels using surrounding pixel information may be used to predict, or a pixel value of the same position of a preceding frame or subsequent frame of the image may be used to predict.

Hereinafter, a method for transmitting/receiving image data which may effectively carry out error correction according to the present exemplary embodiment of the invention will be described in detail.

Figure 6:
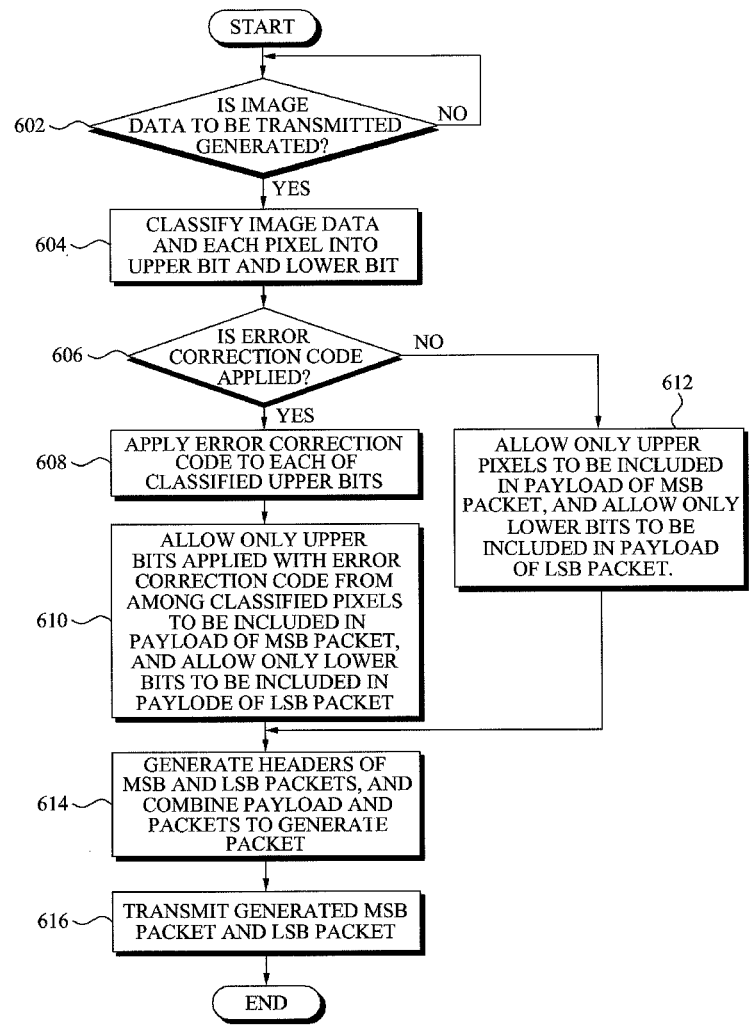
FIG. 6 is a flowchart illustrating a process of transmitting image data in an apparatus for transmitting image data which may effectively carry out error correction according to an exemplary embodiment of the invention.

FIG. 6 is a flowchart illustrating a process of transmitting image data in an apparatus for transmitting image data which may effectively carry out error correction according to an exemplary embodiment of the invention. Referring to FIG. 6, the image data transmitting apparatus classifies each pixel of the image data into the upper bits and lower bits in operation S604 when receiving the image data to be transmitted from an upper hierarchy in operation S602.

Next, in operation S606, the image data transmitting apparatus ascertains whether the error correction code is inserted. In operation S608, the image data transmitting apparatus applies the error correction code for each of the classified upper bits when the error correction code is ascertained to be inserted. In operation S610, the image data transmitting apparatus collects the upper bits on which the error correction code is applied to thereby compose a payload of the MSB packet, and also corrects the lower bits to thereby compose a payload of the LSB packet.

However, the image data transmitting apparatus collects the classified upper bits to compose the payload of the MSB packet and also collects the classified lower bits to compose the payload of the LSB packet in operation S612 when the error correction code is not applied according to the ascertained result of operation S606.

After operation S610 or S612 is terminated, the image data transmitting apparatus generates a header of the MSB packet and a header of the LSB packet in operation S614, and combines the header and the payload to respectively generate the MSB packet and the LSB packet. In this instance, the header of the packet includes error correction code type information, MSB/LSB classification information, information about a position on an image frame of image pixels included in the payload of each of the packets, and sequence information of an image frame.

Next, the image data transmitting apparatus transmits the generated MSB packet and LSB packet to the image data receiving apparatus in operation S616. In this instance, the image data transmitting apparatus respectively transmits each of the MSB packet and LSB packet through a unique communication path. Also, the image data transmitting apparatus transmits the MSB packet through a relatively more secure path in comparison with the path through which the LSB packet is transmitted.

FIG. 7 is a flowchart illustrating a process of receiving image data in an apparatus for receiving image data which may effectively carry out error correction according to an exemplary embodiment of the invention.

Referring to FIG. 7, the image data receiving apparatus analyzes the header of the packet and ascertains information about image pixels included in the packet in operation S704 when receiving image packet in operation S702. In this instance, information about the packet header includes error correction code type information, MSB/LSB classification information, information about a position on an image frame of image pixels included in the payload of each of the packets, and sequence information of an image frame.

Next, the image data receiving apparatus retrieves the MSB packet and LSB packet of a corresponding combination from among received packets in operation S706. In this instance, the image data receiving apparatus advances to the next operation only using the MSB packet or LSB packet when a relative packet of the corresponding combination is not retrieved during a predetermined time period.

Next, the image data receiving apparatus ascertains whether the error correction code is applied in operation S708.

The image data receiving apparatus decodes the upper bits on which error correction encoding is performed from the MSB packet in operation S710 to thereby extract the upper bits when the error correction is applied in the received packet according to the ascertained result. In operation S712, the image data receiving apparatus extracts the lower bits from the LSB packet.

In operation S714, the image data receiving apparatus extracts the upper bits from the MSB packet and also extracts the lower bits from the LSB packet when the error correction is not applied in the received packet according to the ascertained result of operation S708.

Next, in operation S716, the image data receiving apparatus combines the extracted upper bits and lower bits to thereby generate pixels. In this instance, the image data receiving apparatus processes or predicts the corresponding bit to be '0' when the upper bits or lower bits are not extracted due to failure in reception of the MSB packet or LSB packet. As a prediction method, average information of surrounding pixels using surrounding pixel information may be used to predict, or a pixel value of the same position of a preceding frame or next frame of the image may be used to predict.

Next, in operation S718, the image data receiving apparatus combines, as image data, pixels generated using packet header information retrieved in operation S704, and outputs.

The method for transmitting/receiving image data according to the above-described exemplary embodiments of the present invention may be recorded in computer-readable media including program instructions to implement various operations embodied by a computer. The media may also include, alone or in combination with the program instructions, data files, data structures, and the like. The described hardware devices may be configured to act as one or more software modules in order to perform the operations of the above-described exemplary embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for transmitting image data, the method comprising:
   classifying each pixel of image data into upper bits and lower bits;
   enabling the classified upper bits to be included in a payload of a Most Significant Bit (MSB) packet, and also enabling the classified lower bits to be included in a payload of a Least Significant Bit (LSB) packet;
   generating a header of the MSB packet and a header of the LSB packet, wherein the header of the MSB packet and the header of the LSB packet include error correction code type information, MSB/LSB classification information, information about a position on an image frame of image pixels included in the payload of each of the packets, and sequence information of an image frame;
combining the payload and the header to respectively generate the MSB packet and the LSB packet; and
transmitting the generated MSB packet and the LSB packet.

2. The method of claim 1, wherein the enabling of the classified upper bits inserts an error correction code into the upper bit to enable the classified upper bits to be included in the payload of the MSB packet.

3. A method for receiving image data, the method comprising:
receiving a MSB packet or a LSB packet, and analyzing a header of each of the received packets to thereby ascertain information on image pixels included in the packet, wherein the receiving ascertains error correction code type information, MSB/LSB classification information, information about a position on an image frame of image pixels included in the payload of each of the packets, and sequence information of an image frame;
extracting upper bits from the MSB packet;
extracting lower bits from the LSB packet;
combining the upper bits and lower bits of a corresponding combination using the ascertained information about image pixels to thereby generate pixels; and
combining the generated pixels as image data and outputting.

4. The method of claim 3, wherein the extracting of the upper bits decodes the error correction code to extract the upper bits when the error correction code is applied to the upper bits.

5. An apparatus for transmitting image data, the apparatus comprising:
a bit classification unit to classify each pixel of image data into upper bits or lower bits;
a packet generating unit to generate a MSB packet including the upper bits and a LSB packet including the lower bits, wherein the packet generating unit inserts, into a header of the MSB packet and a header of the LSB packet, error correction code type information, MSB/LSB classification information, information about a position on an image frame of image pixels included in the payload of each of the packets, and sequence information of the image frame; and
a communication unit to transmit the generated MSB packet and LSB packet.

6. The apparatus of claim 5, further comprising: an error correction code inserting unit to insert the error correction code to the upper bits, wherein the packet generating unit enables the upper bits having the inserted error correction code to be included in the MSB packet when generating the MSB packet.

7. An apparatus for receiving image data, the apparatus comprising:
a communication unit to receive a MSB packet or a LSB packet;
a packet header analyzing unit to analyze a header of the MSB packet or a header of the LSB packet to ascertain information about image pixels, wherein the packet header analyzing unit ascertains, from a header of the MSB packet or a header of the LSB packet, error correction code type information, MSB/LSB classification information, information about a position of an image frame of image pixels included in the payload of each of the packets, and sequence information of an image frame;
a bit extracting unit to extract upper bits from the MSB packet and to extract the lower bits from the LSB packet; and
an image pixel generating unit to combine the upper bits and lower bits of a corresponding combination using the information about the image pixels to thereby generate pixels, to combine the generated pixels as image data, and to output the combined data.

8. The apparatus of claim 7, further comprising: an error correction code decoding unit to decode upper bits having the inserted error correction code, wherein the bit extracting unit decodes error correction code to extract the upper bits.

\* \* \* \* \*